US012657985B2

(12) United States Patent
Lee et al.

(10) Patent No.: US 12,657,985 B2
(45) Date of Patent: Jun. 16, 2026

(54) CONVEYANCE MODULE OPENING AND CLOSING DEVICE OF AUTOMATED TELLER MACHINE

(71) Applicant: HYOSUNG TNS INC., Seoul (KR)

(72) Inventors: Sang Hyun Lee, Incheon (KR); Sung Chang Hur, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 18/978,322

(22) Filed: Dec. 12, 2024

(65) Prior Publication Data

US 2025/0191434 A1 Jun. 12, 2025

(30) Foreign Application Priority Data

Dec. 12, 2023 (KR) ........................ 10-2023-0179270

(51) Int. Cl.
*G07D 11/40* (2019.01)
*G07D 11/10* (2019.01)
(Continued)

(52) U.S. Cl.
CPC ......... *G07D 11/40* (2019.01); *G07D 2211/00* (2013.01)

(58) Field of Classification Search
CPC .......... G07F 11/24; G07F 11/50; G07F 19/00; G07D 11/10; G07D 11/40; G07D 11/16;
(Continued)

(56) References Cited

U.S. PATENT DOCUMENTS 5,299,511 A * 4/1994 Dallman ................. G07F 19/20 109/24.1
5,946,660 A * 8/1999 McCarty ................... G07F 7/00 705/5

(Continued)

FOREIGN PATENT DOCUMENTS

CN 107341937 A 11/2017
GB 2409751 A * 7/2005 ............... G07D 5/00

(Continued)

OTHER PUBLICATIONS

Layout of Functional Modules and Routing for Preliminary Design of Automatic Teller Machines (Year: 2007).*

(Continued)

*Primary Examiner* — Thien T Mai
(74) *Attorney, Agent, or Firm* — BACON & THOMAS, PLLC

(57) ABSTRACT

One embodiment provides a conveyance module opening and closing device of an automated teller machine, the conveyance module opening and closing device including a fixed frame; a first conveyance module that is provided at one side portion of the fixed frame and has a locking pin formed thereon; a second conveyance module provided at the other side portion of the fixed frame, connected to be stacked with one portion of the first conveyance module, and connected to the fixed frame via a rotating shaft; a rotary member that is provided to be rotatable about a hinge shaft at one side of the second conveyance module and has a catching part, which is configured to be caught to or released from the locking pin, and a guide pin formed thereon; and a guide member that is coupled to the fixed frame and has a guide hole configured to guide movement of the guide pin formed to induce the locking pin and the rotary member to (Continued)

be unlocked when the first conveyance module rotates upward.

10 Claims, 10 Drawing Sheets

(51) Int. Cl.
*G07D 11/16* (2019.01)
*G07F 19/00* (2006.01)

(58) Field of Classification Search
CPC ...... G07D 11/235; G07D 11/14; G07D 11/00; G07D 11/13; G07D 2211/00; G07D 11/12; B65H 29/52; B65H 29/46; B65H 29/42; B65H 29/006; B65H 5/026; E05B 65/0075; E05B 65/461; E05C 9/08
See application file for complete search history.

(56) References Cited

U.S. PATENT DOCUMENTS

| | | | | |
|---|---|---|---|---|
| 7,413,118 | B2 * | 8/2008 | Kim | G07F 19/20 235/379 |
| 2005/0077215 | A1 | 4/2005 | Nago et al. | |
| 2007/0267808 | A1 | 11/2007 | Cha et al. | |
| 2007/0296202 | A1 | 12/2007 | Zwahlen | |
| 2015/0170452 | A1 * | 6/2015 | Chugo | G07D 11/22 194/206 |
| 2015/0266689 | A1 * | 9/2015 | Hashimoto | B65H 29/26 271/207 |
| 2015/0307306 | A1 * | 10/2015 | Kadota | B65H 29/52 271/3.19 |
| 2018/0040187 | A1 * | 2/2018 | Jeong | G07D 11/125 |

FOREIGN PATENT DOCUMENTS

| | | | | |
|---|---|---|---|---|
| JP | 2014123222 | A | 7/2014 | |
| JP | 2017043464 | A | 3/2017 | |
| JP | 6198929 | B2 | 9/2017 | |
| KR | 1020080062855 | A | 7/2008 | |
| SE | 542543 | C2 * | 6/2020 | G07D 11/14 |

OTHER PUBLICATIONS

Anti-Theft Mechanisms in ATM Centres Using Different Sensors (Year: 2019).*
Allowance issued on Jul. 24, 2025, in corresponding Korean application No. 10-2023-0179270.
Search Report issued on May 6, 2025, in corresponding European application No. 24218375.4.

* cited by examiner

[FIG. 1]
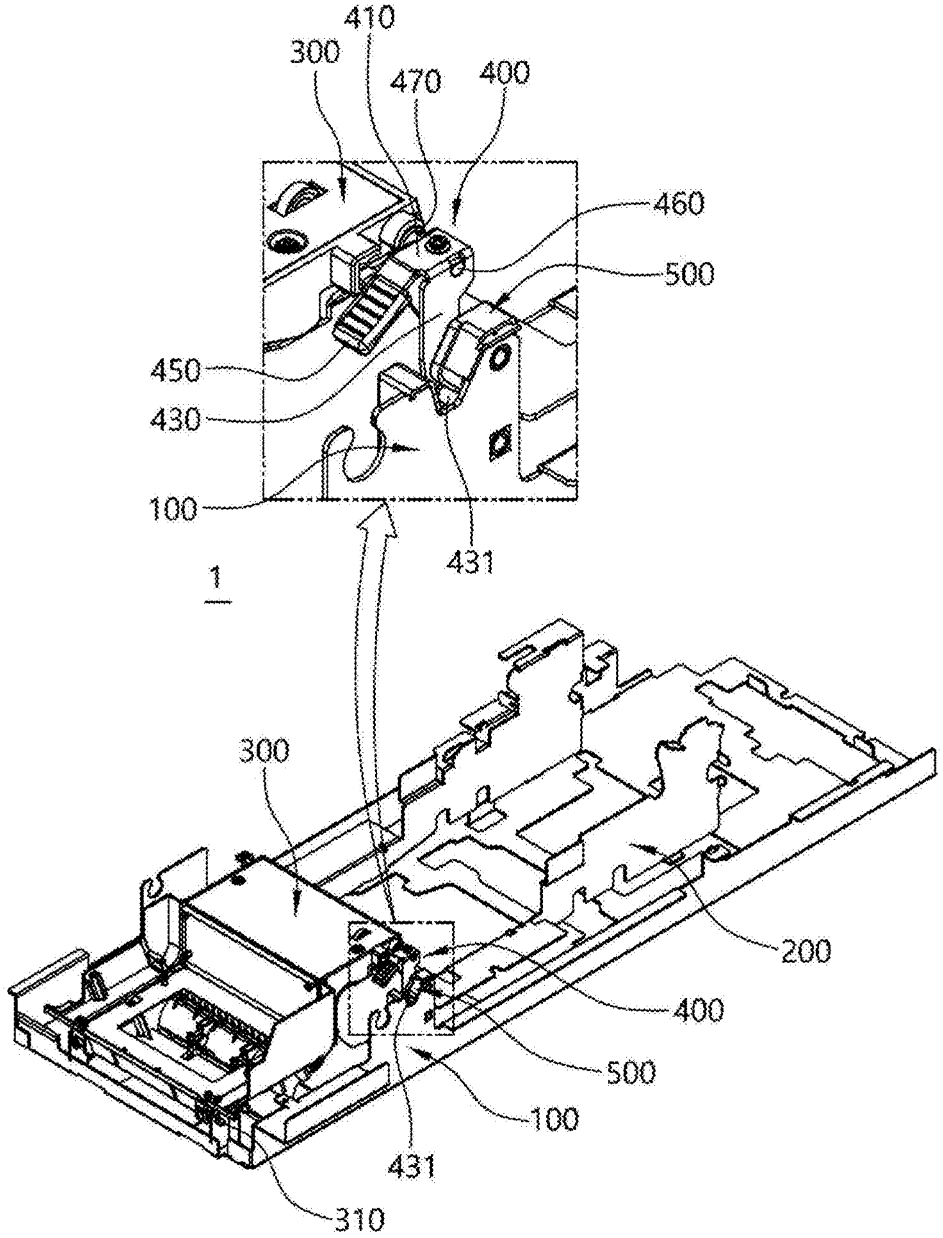

[FIG. 2]
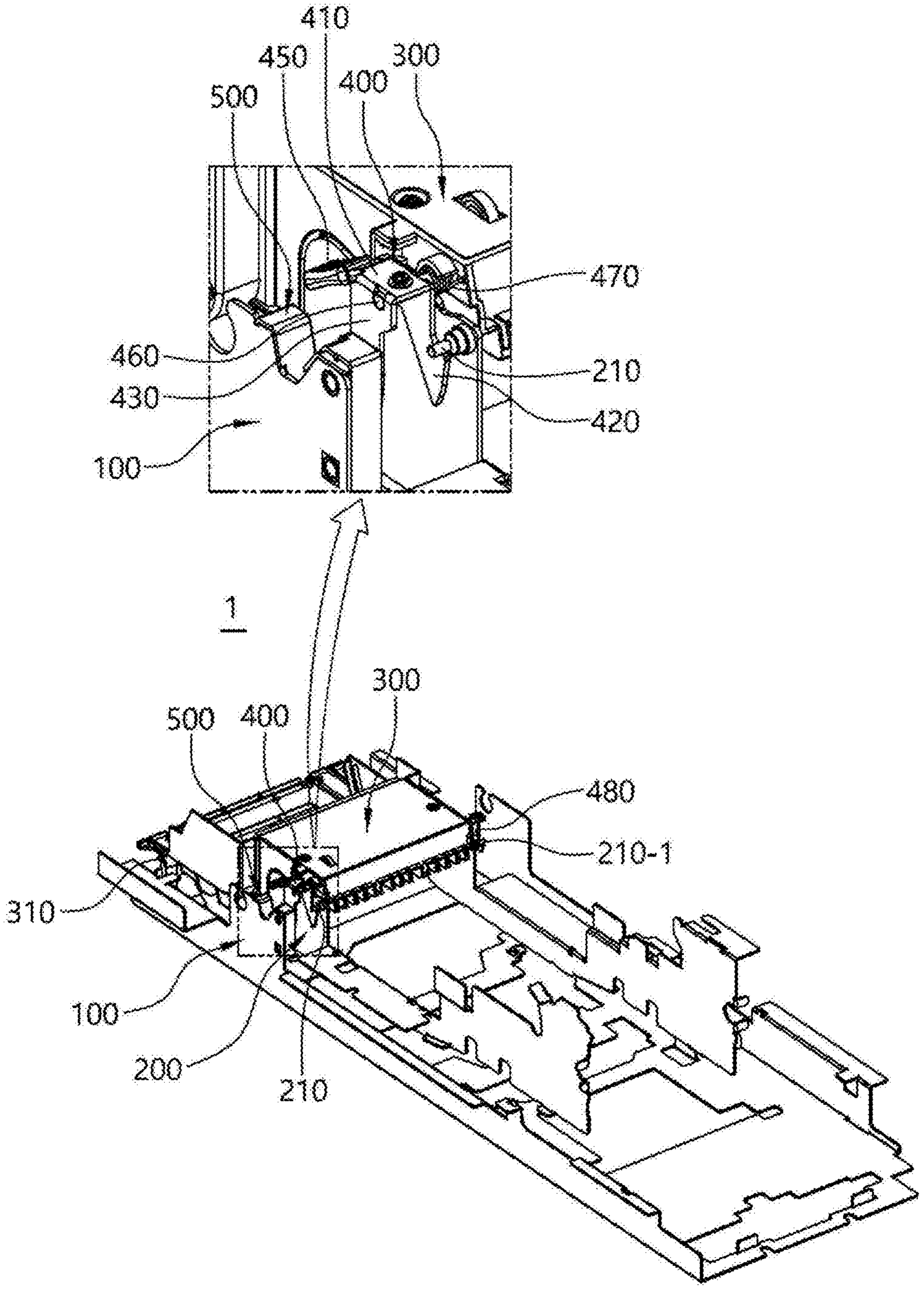

[FIG. 3]
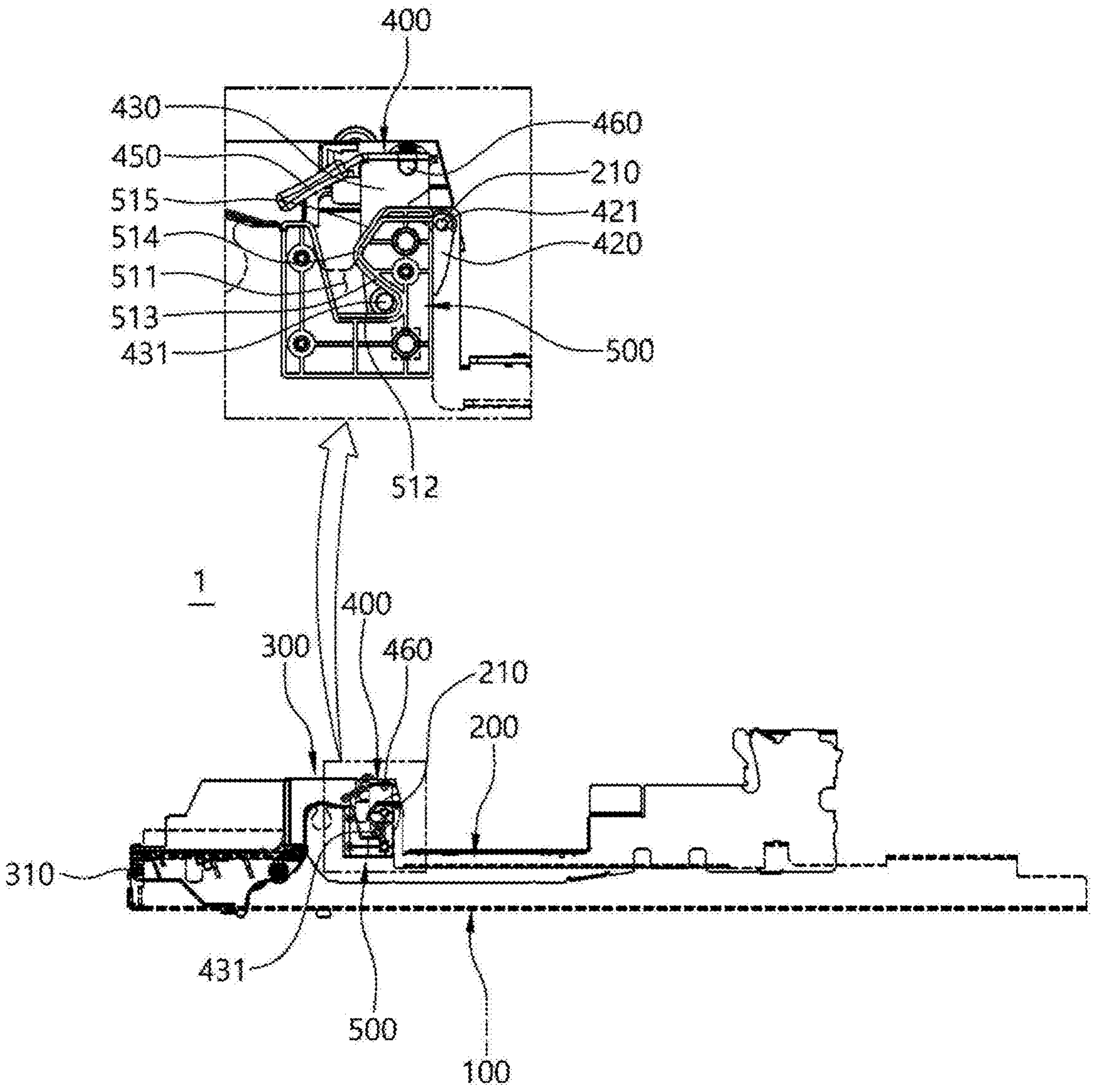

[FIG. 4]
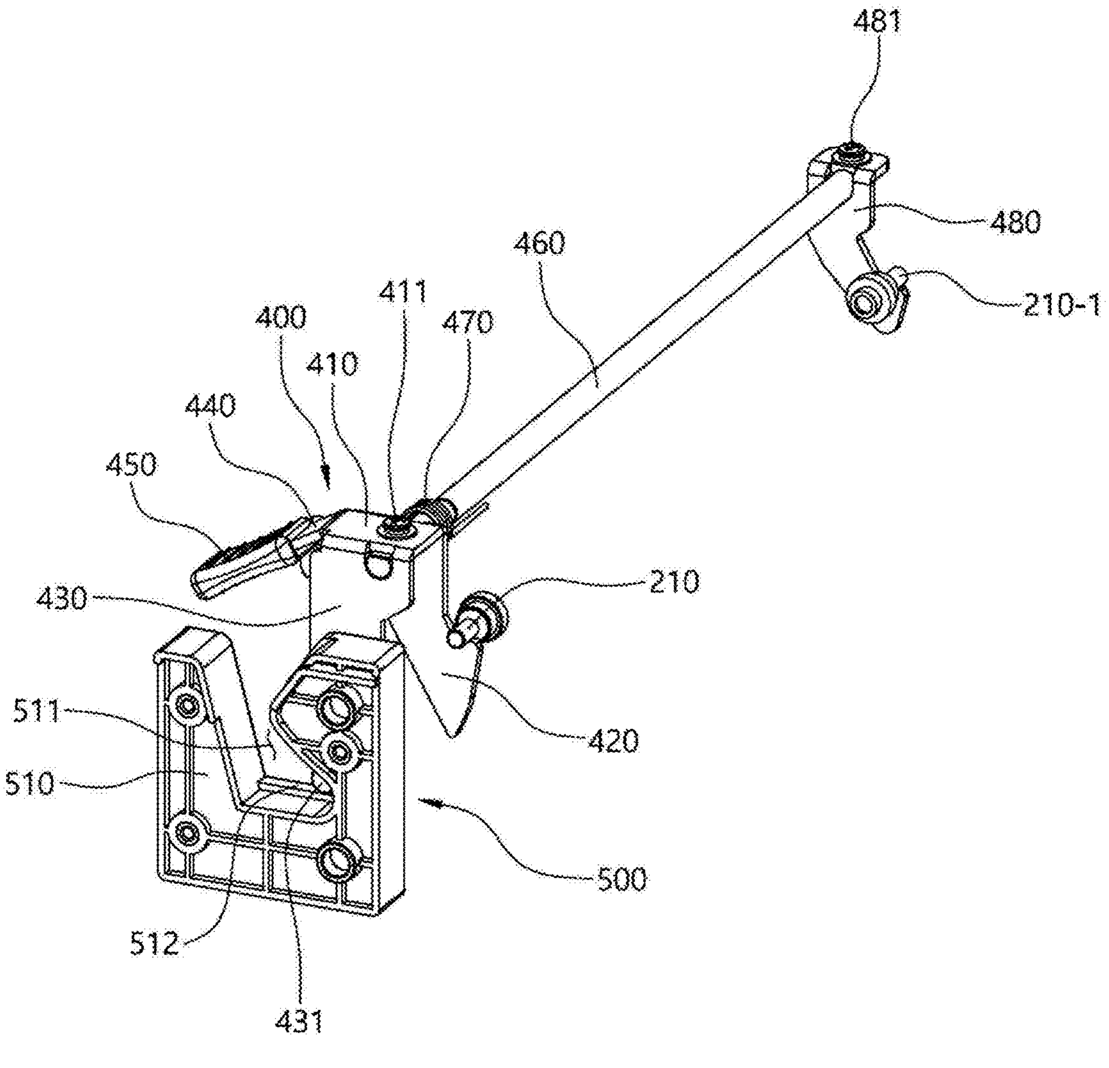

[FIG. 5]
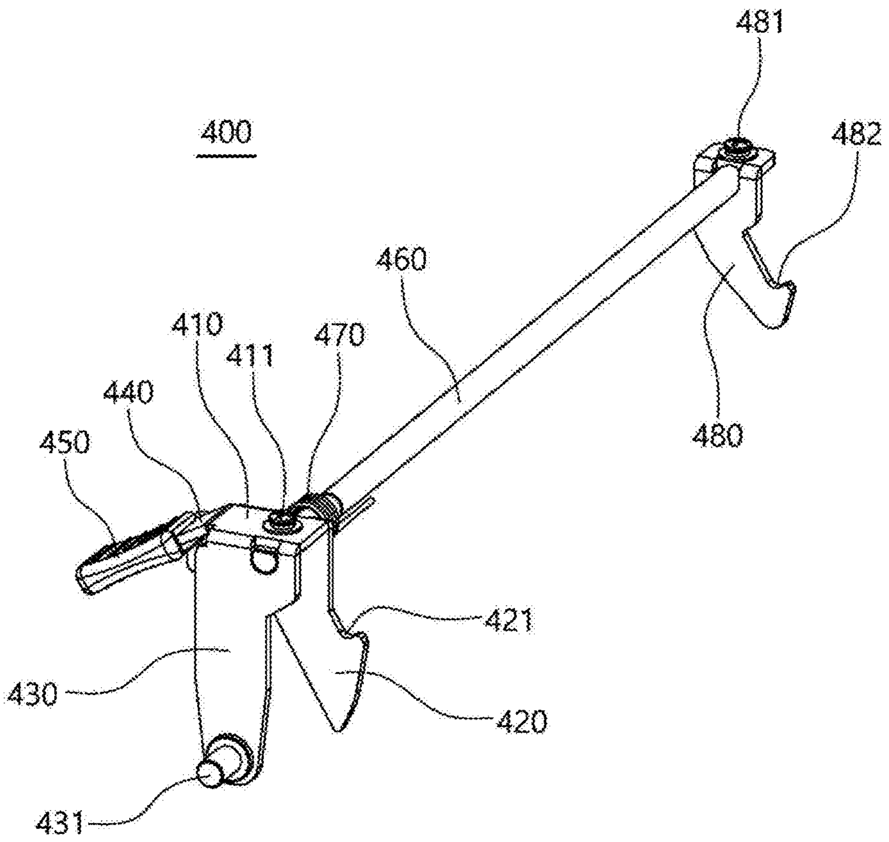

[FIG. 6]
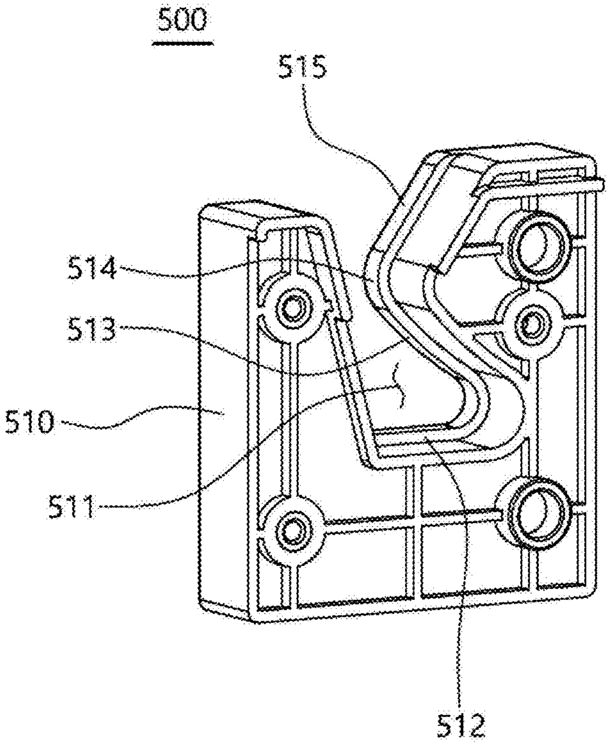

[FIG. 7]
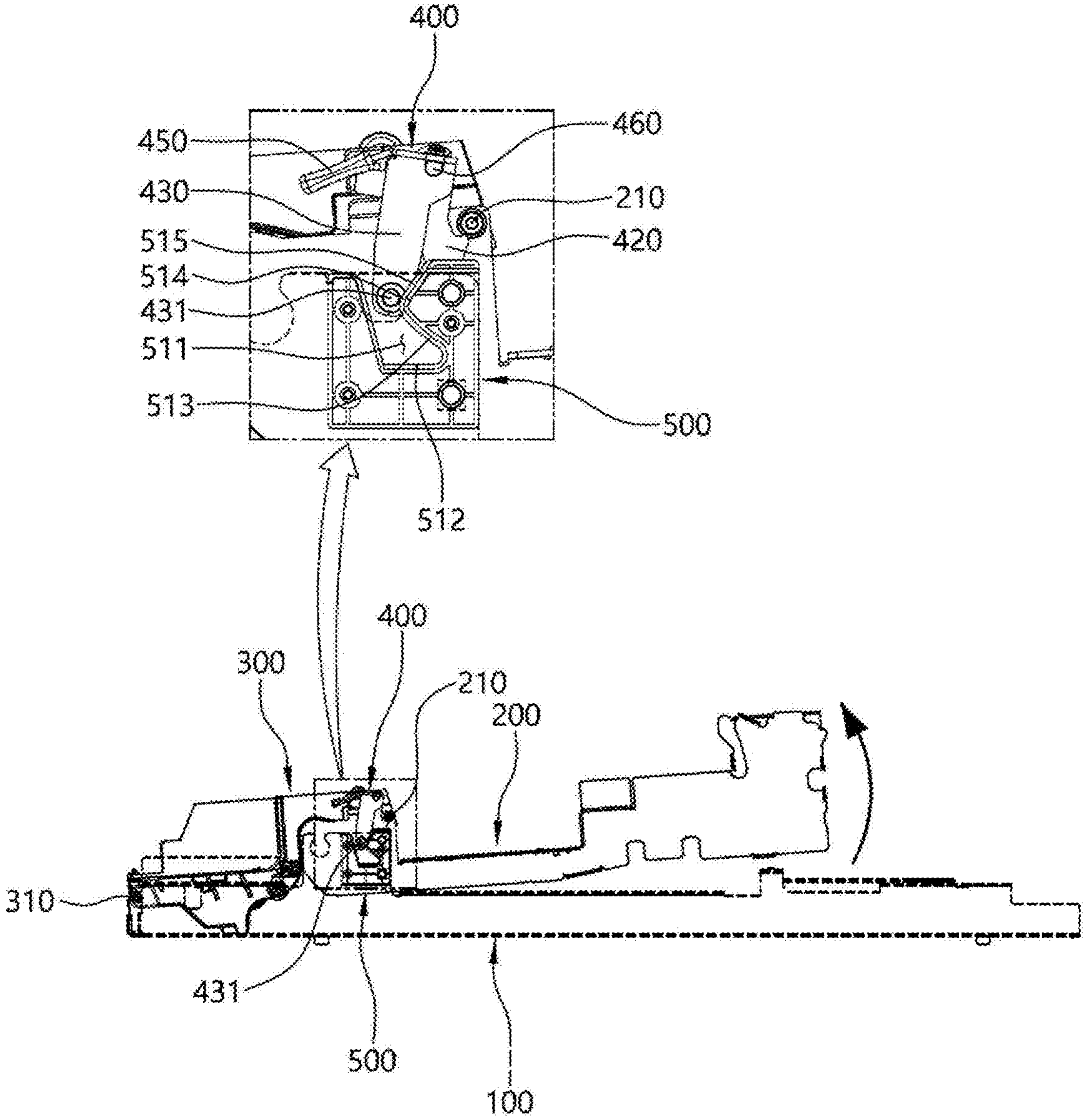

[FIG. 8]
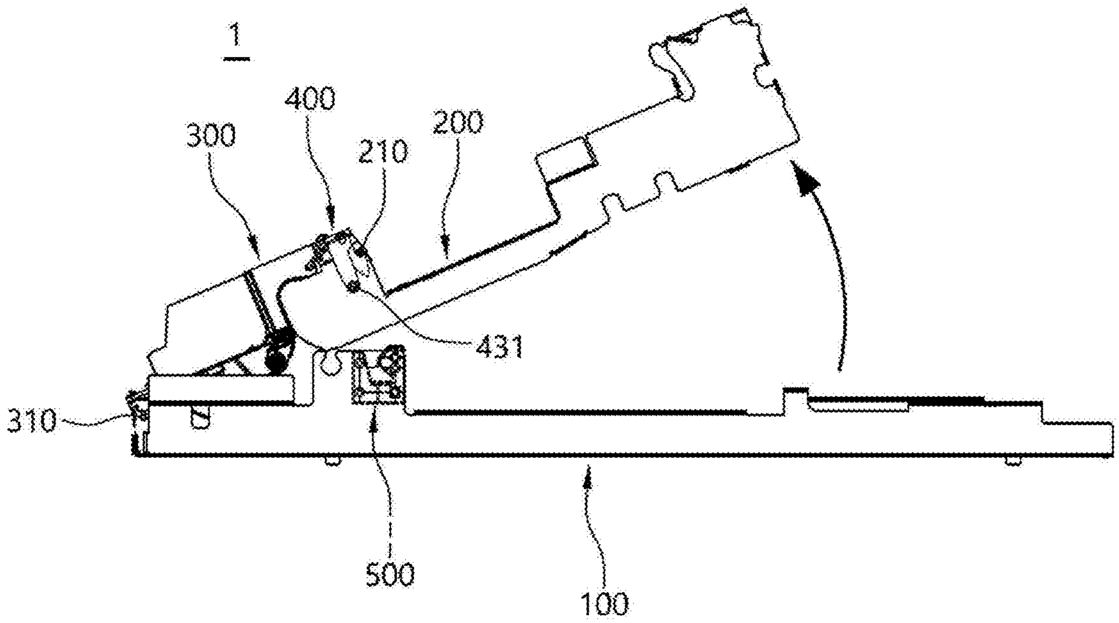

[FIG. 9]
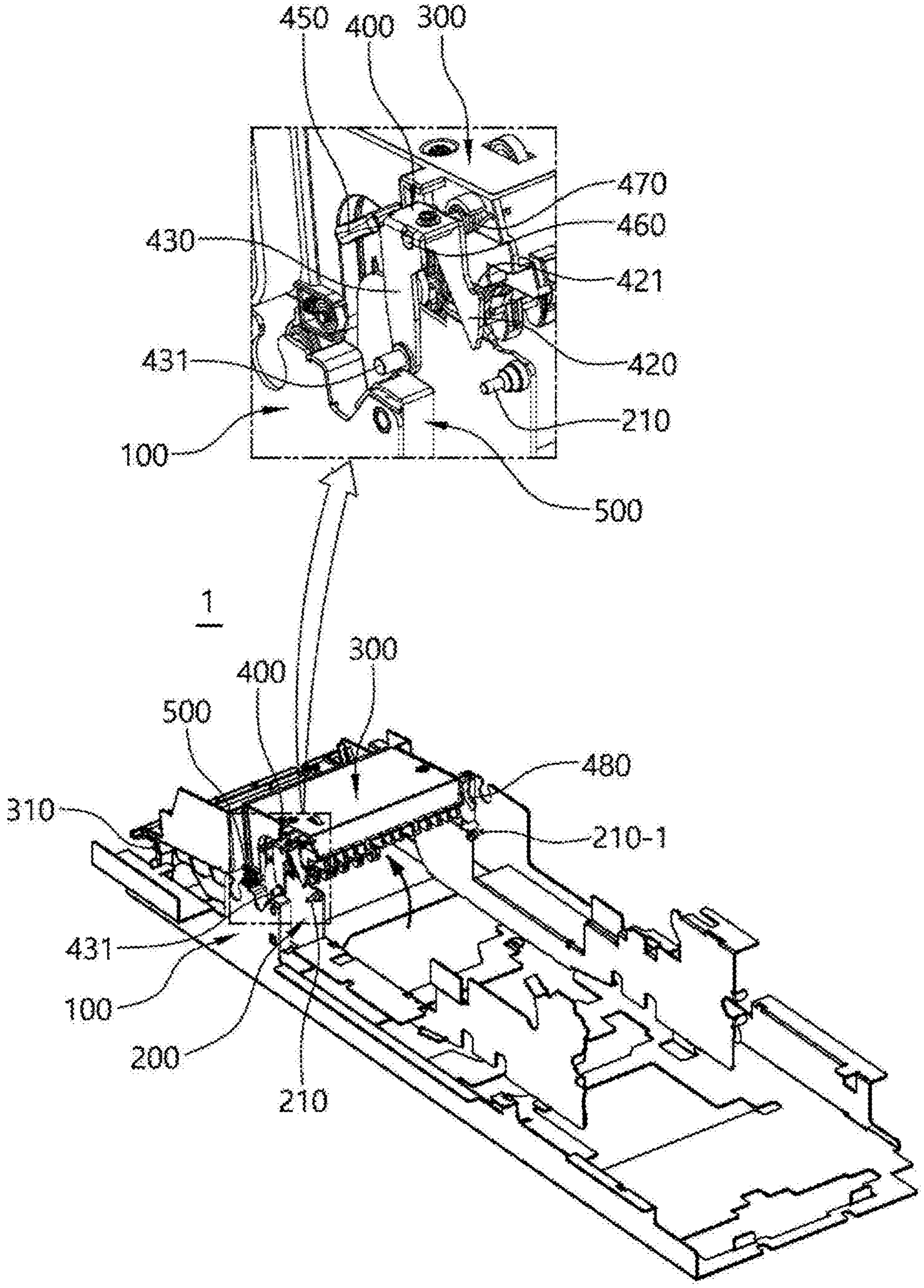

[FIG. 10]
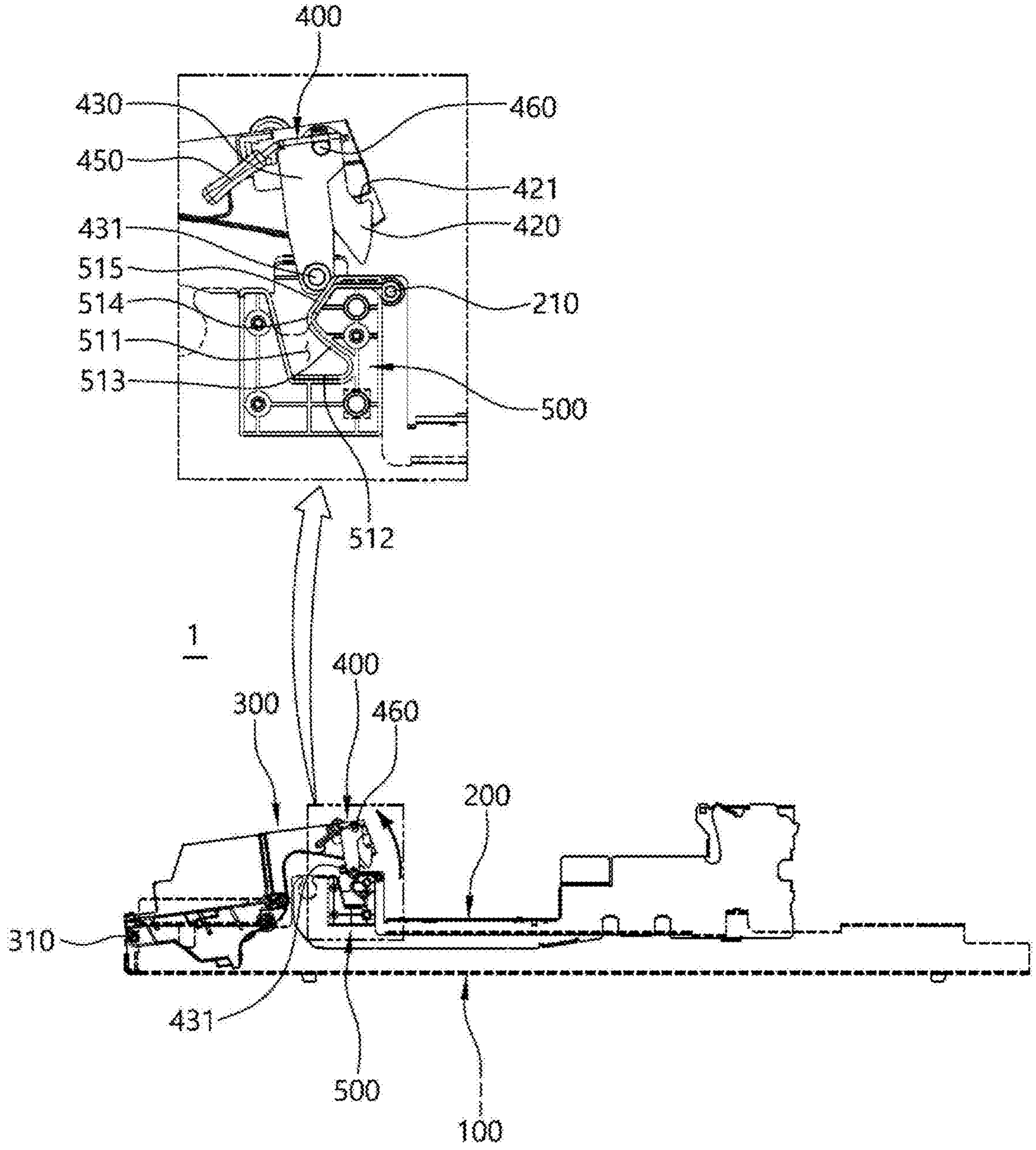

CONVEYANCE MODULE OPENING AND CLOSING DEVICE OF AUTOMATED TELLER MACHINE

BACKGROUND

1. Field of the Invention

The present invention relates to a conveyance module opening and closing device of an automated teller machine, and more particularly, to a conveyance module opening and closing device of an automated teller machine that prevents damage to conveyance paths and improves convenience in use when opening and closing conveyance modules provided in an automated teller machine.

2. Discussion of Related Art

Automated teller machines are devices developed in relation to financial services to promptly and conveniently provide most financial services, excluding a financial advisory service, in an unmanned manner regardless of time. Examples of automated teller machines include a cash dispenser unit (CDU), a bill recycling machine (BRM), and a cash and check in module (CCIM) that can simultaneously process deposition or rejection of media such as multiple banknotes or checks in bundles.

A conventional structure in which a conveyance path is open upward in an automated teller machine is a structure that includes a first conveyance module where a horizontal conveyance path at a front (a front conveyance path) is located and a second conveyance module where a vertical conveyance path (a rear conveyance path) connected downward from a rear side of the horizontal conveyance path is located, wherein the first conveyance module and the second conveyance module are individually locked or unlocked.

According to the above configuration of the conventional conveyance module opening and closing device of an automated teller machine, when the first conveyance module is lifted upward in a state in which the second conveyance module is locked, there is a problem in that the first conveyance module collides with the second conveyance module, which is in a locked state, and causes damage to the conveyance paths, and since a worker has to separately unlock locking devices of the first conveyance module and the second conveyance module in order to open or close the first conveyance module, there is a problem in that convenience in use is reduced.

The related art of the conveyance module opening and closing device of an automated teller machine is published in Korean Patent Registration No. 10-1868151.

SUMMARY OF THE INVENTION

The present invention is directed to providing a conveyance module opening and closing device of an automated teller machine that prevents damage to conveyance paths and improves convenience in use when opening and closing conveyance modules provided in an automated teller machine and has a simplified configuration.

According to an aspect of the present invention, there is provided a conveyance module opening and closing device of an automated teller machine, the conveyance module opening and closing device comprising: a fixed frame; a first conveyance module that is provided at one side portion of the fixed frame and has a locking pin formed thereon; a second conveyance module provided at the other side portion of the fixed frame, connected to be stacked with one portion of the first conveyance module, and connected to the fixed frame via a rotating shaft; a rotary member that is provided to be rotatable about a hinge shaft at one side of the second conveyance module and has a catching part, which is configured to be caught to or released from the locking pin, and a guide pin formed thereon; and a guide member that is coupled to the fixed frame and has a guide hole configured to guide movement of the guide pin formed to induce the locking pin and the rotary member to be unlocked when the first conveyance module rotates upward.

Wherein the rotary member includes a first bracket coupled to the hinge shaft, a second bracket that extends from one side end of the first bracket and has the catching part formed thereon, and a third bracket that extends from the other side end of the first bracket and has the guide pin formed thereon.

Wherein the rotary member further includes a fourth bracket that extends from the first bracket and has a handle part, which is for rotating the rotary member about the hinge shaft, formed thereon.

Wherein the rotary member further includes an elastic member configured to apply an elastic force so that the hinge shaft rotates in a direction in which the catching part is caught to the locking pin.

Wherein the guide hole of the guide member has a horizontal surface configured to guide movement of the guide pin when the first conveyance module rotates upward, a first inclined surface inclined upward from one side end of the horizontal surface toward the other side, a bent surface formed to convexly extend from an upper end of the first inclined surface, and a second inclined surface inclined upward from an upper end of the bent surface toward one side.

Wherein, when the first conveyance module rotates upward, the first conveyance module and the second conveyance module rotate together about the rotating shaft, the rotary member rotates in one direction about the hinge shaft in conjunction with movement of the guide pin from the horizontal surface along the first inclined surface and the bent surface such that the rotary member and the locking pin are unlocked, and the rotary member rotates in the other direction about the hinge shaft in conjunction with movement of the guide pin along the bent surface and the second inclined surface such that the rotary member and the locking pin are locked.

Wherein, when the first conveyance module and the second conveyance module rotate downward from a state in which they are rotated upward, the rotary member rotates in one direction about the hinge shaft in conjunction with movement of the guide pin along the second inclined surface and the bent surface such that the rotary member and the locking pin are unlocked, and the rotary member rotates in the other direction about the hinge shaft in conjunction with movement of the guide pin along the bent surface and the first inclined surface such that the rotary member and the locking pin are locked.

Wherein, when the guide pin is located at a boundary portion between the horizontal surface and the first inclined surface of the guide hole of the guide member, the first conveyance module reaches a locked state.

Wherein, when the rotary member is rotated in one direction and the rotary member and the locking pin are unlocked in a state in which the first conveyance module and the second conveyance module are moved downward and closed, the second conveyance module reaches a state in which it is able to rotate alone about the rotating shaft.

Wherein, the rotary member is provided at one side surface of the second conveyance module; and a catching member that is coupled to the other side end of the hinge shaft and has a catching part formed thereon is provided on the other side surface of the second conveyance module, and a locking pin configured to be caught to or released from the catching part of the catching member in a direction in which the rotary member rotates is additionally formed on the other side surface of the first conveyance module.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a perspective view illustrating a state in which both a first conveyance module and a second conveyance module are locked and closed in a conveyance module opening and closing device of an automated teller machine of the present invention;

FIG. 2 is a perspective view of FIG. 1 viewed from another direction;

FIG. 3 is a side view of FIG. 1;

FIG. 4 is a perspective view of a rotary member and a guide member provided in the conveyance module opening and closing device of an automated teller machine of the present invention;

FIG. 5 is a perspective view of the rotary member provided in the conveyance module opening and closing device of an automated teller machine of the present invention;

FIG. 6 is a perspective view of the guide member provided in the conveyance module opening and closing device of an automated teller machine of the present invention;

FIG. 7 is a side view illustrating an operation in which, as the first conveyance module is rotated upward, the second conveyance module is unlocked due to a guide pin moving along a guide hole of the guide member and the rotary member rotating in an unlocking direction in the conveyance module opening and closing device of an automated teller machine of the present invention;

FIG. 8 is a side view illustrating a state in which the first conveyance module and the second conveyance module are further rotated upward from the state of FIG. 7;

FIG. 9 is a perspective view illustrating a state in which the rotary member is rotated in the unlocking direction and the second conveyance module is rotated upward in the conveyance module opening and closing device of an automated teller machine of the present invention; and FIG. 10 is a side view of FIG. 9.

DETAILED DESCRIPTION OF EXEMPLARY EMBODIMENTS

Hereinafter, configurations and effects relating to exemplary embodiments of the present invention will be described in detail with reference to the accompanying drawings.

Referring to FIGS. 1 to 3, a conveyance module opening and closing device 1 of an automated teller machine of the present invention includes a fixed frame 100, a first conveyance module 200, a second conveyance module 300, a rotary member 400, and a guide member 500.

The fixed frame 100 is provided in a fixed state, supports the first conveyance module 200 and the second conveyance module 300 to be rotatable, and supports the guide member 500 in a fixed state.

The first conveyance module 200 is provided at one side portion of the fixed frame 100 and has a locking pin 210 formed to protrude from one side surface thereof. A horizontal conveyance path (not illustrated) may be provided inside the first conveyance module 200.

The second conveyance module 300 is provided at the other side portion of the fixed frame 100, and one side portion of the second conveyance module 300 is connected to be vertically stacked with the other side portion of the first conveyance module 200 and is connected to the fixed frame 100 via a rotating shaft 310 in order to be vertically rotatable.

The rotary member 400 is provided to be rotatable about a hinge shaft 460 at one side of the second conveyance module 300 and includes a catching part 421 configured to be caught to or released from the locking pin 210 and a guide pin 431 configured to move along a guide hole 511 formed in the guide member 500.

The guide member 500 is coupled to the fixed frame 100, and the guide hole 511 configured to guide movement of the guide pin 431 is formed inside a body 510 of the guide member 500 and serves to induce the locking pin 210 and the rotary member 400 to be unlocked when the first conveyance module 200 rotates upward.

Referring to FIGS. 4 and 5, the rotary member 400 may further include a first bracket 410 coupled to one side end of the hinge shaft 460 by a fastening member 411, a second bracket 420 that extends to be inclined toward one side downward from one side end of the first bracket 410 and has the catching part 421 formed thereon, a third bracket 430 that extends downward from the other side end of the first bracket 410 and has the guide pin 431 formed thereon, and a fourth bracket 440 that extends rearward from the first bracket 410 and has a handle part 450, which is for rotating the rotary member 400 about the hinge shaft 460, formed thereon.

The rotary member 400 may further include an elastic member 470 configured to apply an elastic force so that the hinge shaft 460 rotates in a direction in which the catching part 421 is caught to the locking pin 210. The elastic member 470 may be provided at a circumference of one side portion of the hinge shaft 460, and both ends of the elastic member 470 may be configured as torsion springs each supported by the rotary member 400 and the second conveyance module 300. Due to the action of the elastic member 470, the rotary member 400 receives an elastic force such that the catching part 421 formed on the second bracket 420 is rotated in a direction in which it is caught to the locking pin 210, and simultaneously, the guide pin 431 formed on the third bracket 430 receives an elastic force in a direction in which it is caught to the guide hole 511 of the guide member 500.

The rotary member 400 is provided at one side surface of the second conveyance module 300, a catching member 480 that is coupled to the other side end of the hinge shaft 460 by a fastening member 481 and has a catching part 482 formed thereon may be provided on the other side surface of the second conveyance module 300, and a locking pin 210-1 configured to be caught to or released from the catching part 482 of the catching member 480 in a direction in which the rotary member 400 rotates may be additionally formed on the other side surface of the first conveyance module 200.

Referring to FIGS. 4 to 6, the guide hole 511 configured to guide movement of the guide pin 431 formed on the rotary member 400 is formed inside the body 510 of the guide member 500. The guide hole 511 has a horizontal surface 512 configured to guide movement of the guide pin 431 when the first conveyance module 200 rotates upward, a first inclined surface 513 inclined upward from one side end of the horizontal surface 512 toward the other side, a bent surface 514 formed to convexly extend from an upper end of the first inclined surface 513, and a second inclined surface 515 inclined upward from an upper end of the bent surface 514 toward one side.

FIGS. 1 to 3 illustrate a locked state in which the first conveyance module 200 and the second conveyance module 300 are rotated downward and seated on the fixed frame 100.

Here, the first conveyance module 200 reaches a locked state in which the guide pin 431 is located at a boundary portion between the horizontal surface 512 and the first inclined surface 513 of the guide hole 511 of the guide member 500 to limit arbitrary upward rotation of the first conveyance module 200, and the second conveyance module 300 reaches a locked state in which upward rotation of the second conveyance module 300 is limited by the catching part 482, which is formed on the catching member 480, being caught to the locking pin 210-1 while the catching part 421, which is formed on the second bracket 420 of the rotary member 400, is caught to the locking pin 210.

FIG. 7 illustrates an operation in which, as the first conveyance module 200 is rotated upward, the second conveyance module 300 is unlocked due to the guide pin 431 moving along the guide hole 511 of the guide member 500 and the rotary member 400 rotating in an unlocking direction, and FIG. 8 illustrates a state in which the first conveyance module 200 and the second conveyance module 300 are further rotated upward from the state of FIG. 7.

When the first conveyance module 200 rotates upward, the first conveyance module 200 and the second conveyance module 300 may rotate together about the rotating shaft 310, the rotary member 400 may rotate in one direction about the hinge shaft 460 in conjunction with movement of the guide pin 431 from the horizontal surface 512, which is formed on the guide member 500, along the first inclined surface 513 and the bent surface 514 such that the rotary member 400 and the locking pin 210 may be unlocked, and the rotary member 400 may rotate in the other direction about the hinge shaft 460 in conjunction with movement of the guide pin 431 along the bent surface 514 and the second inclined surface 515 such that the rotary member 400 and the locking pin 210 may be locked.

Meanwhile, when the first conveyance module 200 and the second conveyance module 300 rotate downward from a state in which they are rotated upward as shown in FIG. 8, the rotary member 400 may rotate in one direction about the hinge shaft 460 in conjunction with movement of the guide pin 431 along the second inclined surface 515 and the bent surface 514 such that the rotary member 400 and the locking pin 210 may be unlocked, and the rotary member 400 may rotate in the other direction about the hinge shaft 460 in conjunction with movement of the guide pin 431 along the bent surface 514 and the first inclined surface 513 such that the rotary member 400 and the locking pin 210 may be locked.

When the guide pin 431 is located at the boundary portion between the horizontal surface 512 and the first inclined surface 513 of the guide hole 511 of the guide member 500, the first conveyance module 200 may maintain a locked state in which it does not arbitrarily rotate upward unless it is drawn upward due to a user applying a predetermined force upward.

In this way, according to the present invention, since the conveyance module opening and closing device 1 is configured so that a locked state of the second conveyance module 300 is released in conjunction with upward rotation of the first conveyance module 200, it is possible to prevent damage to conveyance paths and improve convenience in use when opening and closing the first and second conveyance modules 200 and 300 and simplify the configuration of the device for opening and closing the first and second conveyance modules 200 and 300.

FIGS. 9 and 10 illustrate a state in which the rotary member 400 is rotated in an unlocking direction and the second conveyance module 300 is rotated upward in the conveyance module opening and closing device 1 of an automated teller machine of the present invention.

When the rotary member 400 is rotated in one direction and the rotary member 400 and the locking pin 210 are unlocked in a state in which the first conveyance module 200 and the second conveyance module 300 are moved downward and closed, the second conveyance module 300 may reach a state in which it is able to rotate alone about the rotating shaft 310.

In this way, according to the present invention, since the conveyance module opening and closing device 1 is configured so that only the second conveyance module 300 can be vertically rotated alone and opened and closed in a state in which the first conveyance module 200 is closed, it is possible to improve convenience of the tasks of maintenance and repair of the second conveyance module 300.

A conveyance module opening and closing device of an automated teller machine according to the present invention is configured so that a locked state of a second conveyance module is unlocked in conjunction with upward rotation of a first conveyance module, and thus it is possible to prevent damage to conveyance paths and improve convenience in use when opening and closing conveyance modules and simplify the configuration of the conveyance module opening and closing device.

In addition, since the conveyance module opening and closing device is configured so that only the second conveyance module can be opened or closed alone in a state in which the first conveyance module is closed, convenience of the tasks of maintenance and repair of the second conveyance module can be improved.

Exemplary embodiments of the present invention have been described in detail above, but the present invention is not limited to the embodiments described above. Various modifications are possible within the scope of the claims and the detailed description and accompanying drawings of the invention, and such modifications also fall within the present invention.

What is claimed is:

1. A conveyance module opening and closing device of an automated teller machine, the conveyance module opening and closing device comprising:

a fixed frame;

a first conveyance module that is provided at one side portion of the fixed frame and has a locking pin formed thereon;

a second conveyance module provided at the other side portion of the fixed frame, connected to be stacked with one portion of the first conveyance module, and connected to the fixed frame via a rotating shaft;

a rotary member that is provided to be rotatable about a hinge shaft at one side of the second conveyance module, the rotary member having a catching part which is configured to be caught to or released from the locking pin, and a guide pin is formed on the rotary member; and a guide member that is coupled to the fixed frame, the guide member having a guide hole which is configured to guide movement of the guide pin formed to induce the locking pin and the rotary member to be unlocked when the first conveyance module rotates upward.

2. The conveyance module opening and closing device of claim 1, wherein the rotary member includes a first bracket coupled to the hinge shaft, a second bracket that extends from one side end of the first bracket and has the catching part formed thereon, and a third bracket that extends from the other side end of the first bracket and has the guide pin formed thereon.

3. The conveyance module opening and closing device of claim 2, wherein the rotary member further includes a fourth bracket that extends from the first bracket and has a handle part, which is for rotating the rotary member about the hinge shaft, formed thereon.

4. The conveyance module opening and closing device of claim 1, wherein the rotary member further includes an elastic member configured to apply an elastic force so that the hinge shaft rotates in a direction in which the catching part is caught to the locking pin.

5. The conveyance module opening and closing device of claim 1, wherein the guide hole of the guide member has a horizontal surface configured to guide movement of the guide pin when the first conveyance module rotates upward, a first inclined surface inclined upward from one side end of the horizontal surface toward the other side, a bent surface formed to convexly extend from an upper end of the first inclined surface, and a second inclined surface inclined upward from an upper end of the bent surface toward one side.

6. The conveyance module opening and closing device of claim 5, wherein, when the first conveyance module rotates upward, the first conveyance module and the second conveyance module rotate together about the rotating shaft, the rotary member rotates in one direction about the hinge shaft in conjunction with movement of the guide pin from the horizontal surface along the first inclined surface and the bent surface such that the rotary member and the locking pin are unlocked, and the rotary member rotates in the other direction about the hinge shaft in conjunction with movement of the guide pin along the bent surface and the second inclined surface such that the rotary member and the locking pin are locked.

7. The conveyance module opening and closing device of claim 6, wherein, when the first conveyance module and the second conveyance module rotate downward from a state in which they are rotated upward, the rotary member rotates in one direction about the hinge shaft in conjunction with movement of the guide pin along the second inclined surface and the bent surface such that the rotary member and the locking pin are unlocked, and the rotary member rotates in the other direction about the hinge shaft in conjunction with movement of the guide pin along the bent surface and the first inclined surface such that the rotary member and the locking pin are locked.

8. The conveyance module opening and closing device of claim 5, wherein, when the guide pin is located at a boundary portion between the horizontal surface and the first inclined surface of the guide hole of the guide member, the first conveyance module reaches a locked state.

9. The conveyance module opening and closing device of claim 1, wherein, when the rotary member is rotated in one direction and the rotary member and the locking pin are unlocked in a state in which the first conveyance module and the second conveyance module are moved downward and closed, the second conveyance module reaches a state in which it is able to rotate alone about the rotating shaft.

10. The conveyance module opening and closing device of claim 1, wherein:

the rotary member is provided at one side surface of the second conveyance module; and a catching member that is coupled to the other side end of the hinge shaft and has a catching part formed thereon is provided on the other side surface of the second conveyance module, and a locking pin configured to be caught to or released from the catching part of the catching member in a direction in which the rotary member rotates is additionally formed on the other side surface of the first conveyance module.

* * * * *